United States Patent
Baglino et al.

(10) Patent No.: US 8,970,147 B2
(45) Date of Patent: Mar. 3, 2015

(54) TRACTION MOTOR CONTROLLER WITH DISSIPATION MODE

(75) Inventors: Andrew David Baglino, San Francisco, CA (US); Greg Grant Solberg, Berkeley, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 125 days.

(21) Appl. No.: 13/172,786

(22) Filed: Jun. 29, 2011

(65) Prior Publication Data

US 2013/0002173 A1    Jan. 3, 2013

(51) Int. Cl.
| | | |
|---|---|---|
| *H02P 21/14* | (2006.01) | |
| *B60L 11/18* | (2006.01) | |
| *H02P 6/08* | (2006.01) | |
| *H02P 21/00* | (2006.01) | |

(52) U.S. Cl.
CPC ....... *B60L 11/1872* (2013.01); *B60L 2240/425* (2013.01); *B60L 2240/525* (2013.01); *B60L 2240/545* (2013.01); *Y02T 10/7005* (2013.01); *Y02T 10/705* (2013.01); *Y02T 10/642* (2013.01)
USPC ................. 318/400.09; 310/156.06; 310/190; 310/216; 310/233; 310/256

(58) Field of Classification Search
USPC ........................ 318/400.09, 590, 591, 568.17; 310/156.06, 190, 216, 223, 256
See application file for complete search history.

(56) References Cited

U.S. PATENT DOCUMENTS

| | | | | |
|---|---|---|---|---|
| 5,227,703 | A * | 7/1993 | Boothe et al. ................. | 318/139 |
| 6,327,524 | B1 * | 12/2001 | Chen ............................... | 701/22 |
| 6,573,675 | B2 * | 6/2003 | Schmitz et al. ............... | 318/434 |
| 6,713,888 | B2 * | 3/2004 | Kajiura ........................ | 290/40 F |
| 6,831,429 | B2 * | 12/2004 | Fu .................................. | 318/139 |
| 6,936,991 | B2 * | 8/2005 | Chen et al. ..................... | 318/700 |
| 7,683,570 | B2 * | 3/2010 | Krauer et al. ................. | 320/104 |
| 7,747,363 | B1 * | 6/2010 | Tang ............................... | 701/22 |
| 7,821,224 | B2 | 10/2010 | Baglino et al. | |
| 7,847,501 | B2 * | 12/2010 | Baglino et al. ................ | 318/432 |
| 8,336,319 | B2 * | 12/2012 | Johnston et al. .................. | 62/79 |
| 2003/0146723 | A1 * | 8/2003 | Pavlov et al. ................. | 318/432 |
| 2009/0256517 | A1 | 10/2009 | Baglino et al. | |
| 2010/0090629 | A1 * | 4/2010 | Tang ........................ | 318/400.09 |
| 2011/0072841 | A1 * | 3/2011 | Arai et al. .................... | 62/259.2 |

FOREIGN PATENT DOCUMENTS

JP        2008230594 A   * 10/2008

* cited by examiner

*Primary Examiner* — Rina Duda
*Assistant Examiner* — Said Bouziane
(74) *Attorney, Agent, or Firm* — J. Richard Soderberg (57) ABSTRACT

An apparatus in an electric vehicle including a propulsion electric motor powered by energy from an energy storage system, including a field oriented motor controller generating motor control signals for the electric motor, the motor control signals responsive to a flux command signal and a torque command signal; a torque command calculator, coupled to the motor controller, generating the torque command signal to command a desired torque; an optimal efficiency controller, coupled to the torque command calculator, generating an operating efficiency flux to operate the electric motor at a first determinable efficiency using a first power from the energy storage system while providing the desired torque; an excess dissipation controller generating an inefficient flux to operate the electric motor at a second determinable efficiency using a second power from the energy storage system independent of the desired torque wherein the second power is greater than the first power; and a mode controller setting the flux command signal using one of the optimal efficiency flux and the inefficient flux.

28 Claims, 6 Drawing Sheets

TRACTION MOTOR CONTROLLER WITH DISSIPATION MODE

BACKGROUND OF THE INVENTION

The present invention relates generally to electric vehicles (EVs), and more specifically, but not exclusively, to intentionally inefficient operation (e.g., excess power dissipation) of a drive inverter/electric motor for generation of excess heat used to enhance vehicle performance at reduced ambient temperature.

EV designers continue to find ways to improve efficiencies in propulsion and energy conversion between a propulsion battery and a propulsion electric motor. Heat is a principle way that inefficiencies appear, and in many parts of the EV design, designers include cooling systems and other design elements that are designed to maintain the battery at a safe operating temperature and otherwise reduce and mitigate high temperatures. Typically fluidic cooling systems, heat exchangers, and coolant paths are designed to isolate the battery from "standard" adverse affects of heating the battery. U.S. patent application Ser. No. 12/835,486 entitled "THERMAL MANAGEMENT SYSTEM WITH DUAL MODE COOLANT LOOPS" filed 13 Jul. 2010 is hereby expressly incorporated herein by reference for all purposes.

There are many ways to provide torque control for the electric motor of an EV. A preferred implementation of a torque control using modulation of a flux linkage (flux) is described in U.S. Pat. No. 7,847,501 entitled "VARYING FLUX VERSUS TORQUE FOR MAXIMUM EFFICIENCY" filed 7 Mar. 2008 which is hereby expressly incorporated herein by reference for all purposes. That patent describes flux control to increase efficiency or decrease the power loss of the EV throughout its operating range.

Cold weather operation of an EV poses additional design challenges as battery performance has a generally inverse relationship to temperature. What is needed is an apparatus and method for mitigating cold ambient performance degradation of the EV.

BRIEF SUMMARY OF THE INVENTION

Disclosed is an apparatus and method for mitigating cold ambient performance degradation of an EV, such as, for example, improving battery efficiency (e.g., increase amount of energy out of the battery). The following summary of the invention is provided to facilitate an understanding of some of technical features related to generation and use of dissipation mode heat, and is not intended to be a full description of the present invention. A full appreciation of the various aspects of the invention can be gained by taking the entire specification, claims, drawings, and abstract as a whole. Specifically, the preferred embodiments of the present generate large quantities of heat that are beneficial for mitigating some performance degradation of EVs in cold ambient environments. This large amount of excess energy dissipation may find other specialized uses outside of this preferred application.

An apparatus in an electric vehicle including a propulsion electric motor powered by energy from an energy storage system, including a field oriented motor controller generating motor control signals for the electric motor, the motor control signals responsive to a flux command signal and a torque command signal; a torque command calculator, coupled to the motor controller, generating the torque command signal to command a desired torque; an optimal efficiency controller, coupled to the torque command calculator, generating an operating efficiency flux to operate the electric motor at a first determinable efficiency using a first power from the energy storage system while providing the desired torque; an excess dissipation controller generating an inefficient flux to operate the electric motor at a second determinable efficiency using a second power from the energy storage system independent of the desired torque wherein the second power is greater than the first power; and a mode controller setting the flux command signal using one of the optimal efficiency flux and the inefficient flux.

A method for controlling a propulsion electric motor powered by energy from an energy storage system includes a) generating a torque command signal to command a desired torque, the torque command used by a field oriented motor controller generating motor control signals for the propulsion electric motor, the motor control signals responsive to a flux command signal and the torque command signal; b) generating an operating efficiency flux to operate the propulsion electric motor at a first determinable efficiency resulting in a first power dissipation while providing the desired torque; c) generating an inefficient flux to operate the propulsion electric motor at a second determinable efficiency resulting in a second power dissipation independent of the desired torque wherein the second power dissipation is greater than the first power dissipation; and d) selecting one of an optimal efficiency mode or a dissipation mode wherein the optimal efficiency mode uses the operating efficiency flux as the flux command signal and wherein the dissipation mode uses the inefficient flux as the flux command signal.

One of the premises of the preferred implementations of the present invention includes the design and implementation of structures and methods for EVs that are contrary to the accepted idea that optimal efficiency is the gold standard guiding all decisions for all operational modes of the EV under all conditions. The preferred embodiments provide intentional and purposeful structures and methods designed to safely dissipate as much power as possible as heat (i.e., waste energy), with the knowledge that this heat has value in particular circumstances. A key part of the implementation involves setting appropriate dissipation mode power dissipation targets which are a function of battery power availability and include tight integration between battery and motor controls. In some implementations, to achieve more of the benefits of the dissipation mode, the thermal system is designed to allow the output coolant from the drive transmission/inverter/motor to flow into the propulsion battery pack. Purposely adding heat into a battery pack is also something that lithium ion battery pack designers, and thus thermal system architects, traditionally avoid. Keeping the cells cooler is often better for cell safety and life.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and from a part of the specification, further illustrate the present invention and, together with the detailed description of the invention, serve to explain the principles of the present invention.

DETAILED DESCRIPTION OF THE INVENTION

Embodiments of the present invention provide an apparatus and method for mitigating cold ambient performance degradation of an EV. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Generally, a motor controller is configured to, among other things, control the performance of a motor. In applications having a limited power supply, e.g., a battery or other energy storage system, the motor controller is advantageously configured to control the motor at specified or determinable efficiency or power loss. In certain electric vehicle (EV) applications, however, maximizing the efficiency is sometimes difficult while also controlling the motor to produce a desired torque or speed. The incorporated U.S. Pat. No. 7,847,501 recognized, among other things, that the flux linkage (or "flux") of a motor in an EV may be modulated according to the desired torque to increase the efficiency or decrease the power loss of the EV throughout the operating range of the EV. In the '501 patent, a first flux value is calculated at a desired torque value, the first flux value corresponding to a determinable (e.g., maximum) efficiency of the EV. Further, a first torque-producing current is calculated as a function of the first flux value, and the motor of an EV is controlled using a control signal, the control signal calculated as a function of the first flux value and the first torque-producing current.

The present invention includes an enhancement to that invention which, among other uses, improves EV performance in cold ambient. In the preferred embodiment, the system includes both the optimal high-efficiency mode as well as an additional dissipation mode. The dissipation mode for the EV produces a desired level of power dissipation (e.g., maximum power dissipation) given inverter and motor constraints for current and temperature and battery constraints including available power. Preferably the dissipation mode is accomplished by modulating the flux reference in a motor controller using the type of torque control described in the '501 patent. Obviously the '501 patent chooses an optimal efficiency flux reference based upon the driver's torque command while the dissipation mode intentionally chooses a sub-optimal higher flux reference even when a more optimum lower flux reference value is available. In this application, optimal refers to greater power efficiency while sub-optimal refers to purposeful power dissipation preferably through generation of heat.

Figure 1:
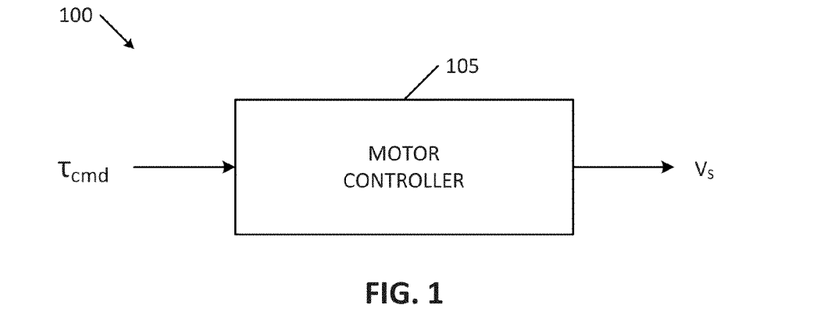
FIG. 1 illustrates generally a block diagram of a system including a motor controller.

FIG. 1 illustrates a generally a block diagram of a system 100 including a motor controller 105. Motor controller 105 is configured to receive a torque command value ($\tau_{cmd}$) and output a control signal ($V_s$) for controlling a motor of an EV. Motor controller 105 may include a device or one or more electrical components configured to control the performance of a motor. In certain examples, motor controller 105 includes an electric machine controller configured to control the performance of an electric machine, such as a generator or other electric machine.

The torque command value includes, or may otherwise be derived using, information from a throttle or other EV speed or torque input (e.g., input from a user). In certain examples, the torque command value is taken directly from the input from the user, or the torque command value is modulated, such as by filtering the user input to obtain a smoother or more realistic response or acceleration, a more constant or stable speed or torque, or to apply one or more other driving features, such as traction control or cruise control.

Generally, an EV includes certain components, such as a propulsion electric motor, a power source (e.g., a battery or other energy source), drive electronics, a power delivery system (e.g., a transmission), and other vehicle systems appropriate for the EV application. Typically the drive electronics include motor controller 105, an inverter, and other components. There are different types of electric motors available for an EV including an alternating current (AC) induction motor, a synchronous AC motor, a direct current (DC) motor, a stepper motor, or other type of electric motor capable of providing power to propel the EV. The EV is not limited to "traditional" terrestrial vehicles and may include all manner of vehicle whether ground based, aquatic based, air based, or other based vehicle capable of being propelled using a motor.

Figure 2:
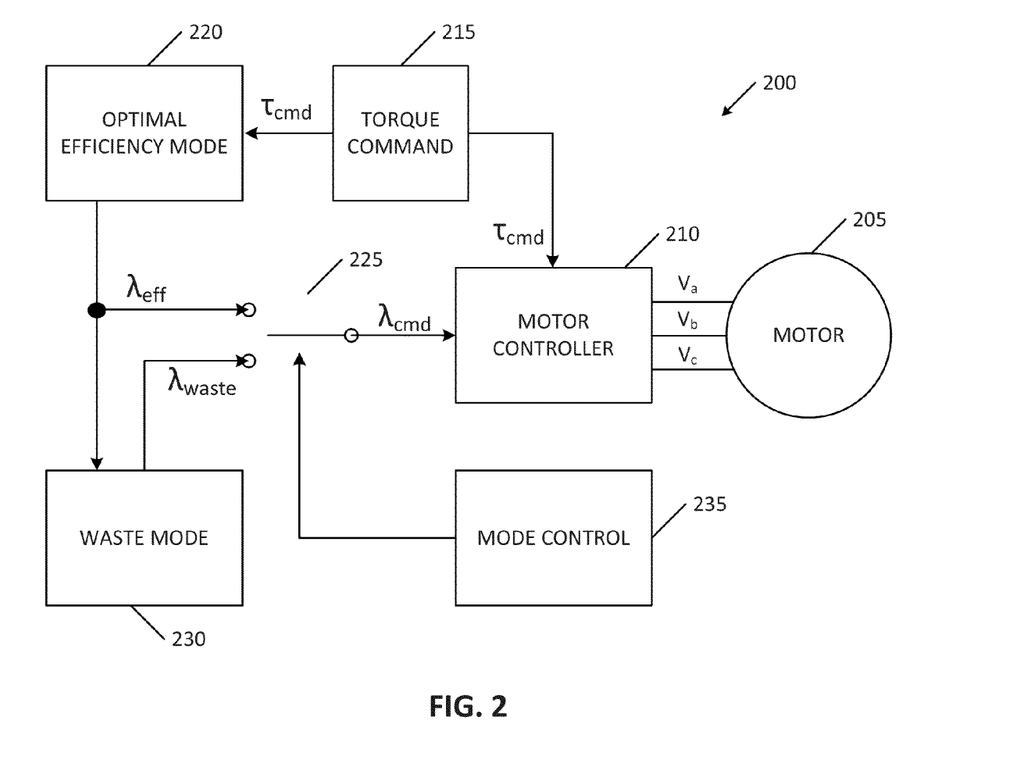
FIG. 2 illustrates generally a block schematic diagram for a representative system including a motor and a motor controller.

FIG. 2 illustrates generally a block schematic diagram for a representative system 200 including a motor 205 and a motor controller 210. Motor 205 is preferably a polyphase AC induction electric motor. Motor controller 210 is preferably a field oriented motor controller responsive to a torque command ($\tau_{cmd}$) and a flux command ($\lambda_{cmd}$) to set desired levels for the output control voltages for each phase (in this example for a three-phase motor, control voltages are $V_a$, $V_b$, and $V_c$). System 200 of the preferred embodiment supports both an optimal efficiency mode and a dissipation mode. As explained in more detail herein, the dissipation mode of the preferred embodiment is derivative of the optimal efficiency mode but in some applications these modes may be more independent than shown and described.

Motor controller 210 is configured to output the control signals using an integrated inverter (not shown). The inverter includes one or more electronic circuits or components configured to convert DC power to AC power. In some embodiments there will be a discrete inverter for generation of the motor control signals. Either implementation may benefit from the present invention.

The optimal efficiency mode may be calculated in many different ways including as described in the incorporated US '501 patent. In general, a torque command calculator 215 establishes the torque command $\tau_{cmd}$ that is provided to both motor controller 210 and to an optimal efficiency mode calculation process 220. Process 220 generates an appropriate flux for optimal efficiency ($\lambda_{eff}$) at a first input to a single pole double throw switch 225 (or other equivalent switching function or mechanism which can be performed in software or the like). An output of switch 225 is coupled to motor controller 210 to provide the flux command $\lambda_{cmd}$ provided to motor controller 210.

The optimal efficiency flux $\lambda_{eff}$ is also provided to a dissipation mode calculation process 230. Process 230 generates a waste flux ($\lambda_{waste}$) for appropriate power dissipation at a second input to switch 225, with the waste flux being derivative/responsive to the optimal efficiency flux. (In the preferred embodiment as described further herein, the dissipation mode has a minimum value equal to the optimal efficiency flux). A mode controller 235 controls switch 225 to set the flux command $\lambda_{cmd}$ to the optimal efficiency flux $\lambda_{eff}$ for optimal efficiency mode and to set the flux command $\lambda_{cmd}$ to the waste flux $\lambda_{waste}$ for the dissipation mode.

Figure 3:
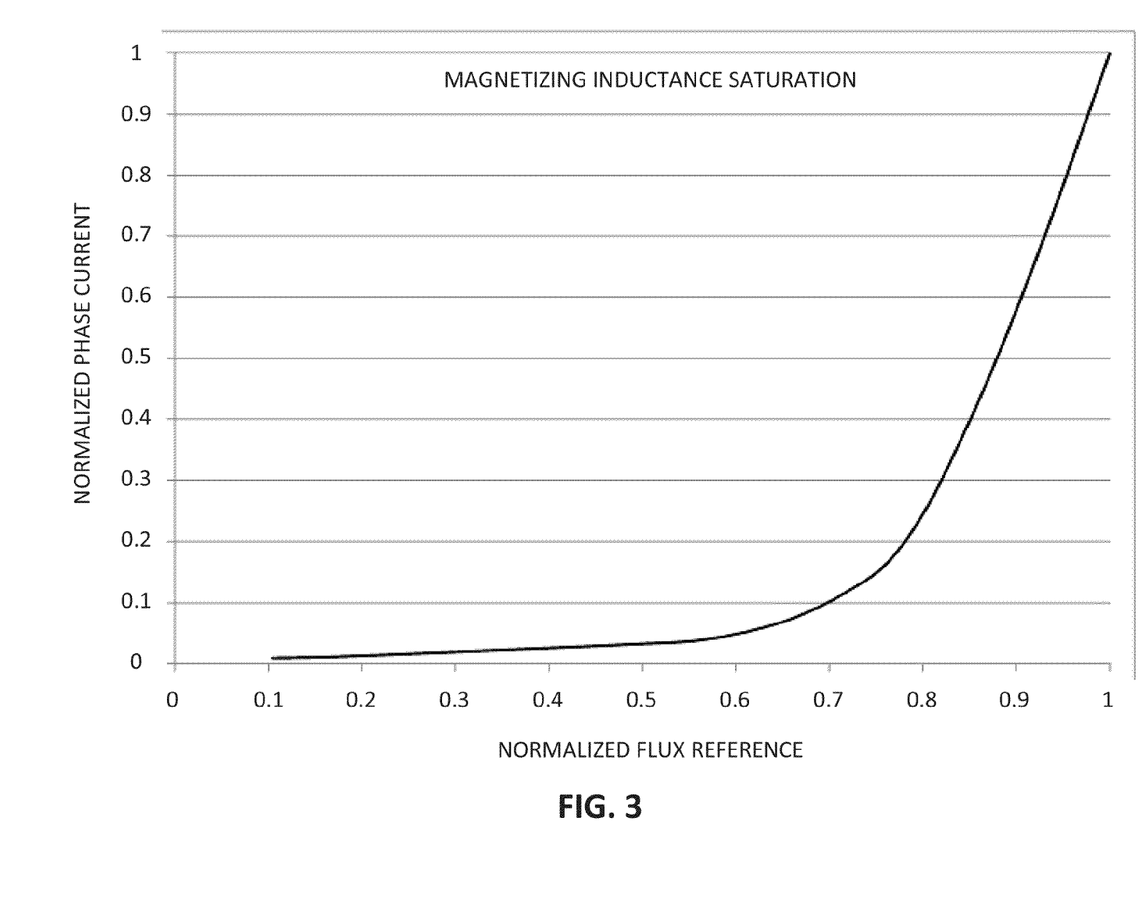
FIG. 3 illustrates a representative saturation curve for the motor shown in FIG. 2.

FIG. 3 illustrates a representative saturation curve for motor 205 shown in FIG. 2. As typical, the saturation curve is non-linear, allowing the phase current in motor 205 to rapidly increase as a sub-optimal flux reference is achieved. Power dissipation varies generally linearly with current in a drive inverter associated with motor 205. Power dissipation varies as a square of phase current in motor 205. Therefore small changes in the flux reference into the sub-optimal operating region changes the realized power dissipation for the inverter and motor dramatically.

In the dissipation mode for system 200, process 230 is implemented to achieve a target minimum power dissipation in the inverter and motor 205 regardless of the torque command $\tau_{cmd}$. Note that it is possible to achieve the target power dissipation in the dissipation mode even when producing zero torque (e.g., the EV is parked or in an idle state). As shown in more detail in FIG. 4 below, dissipation mode calculation process 230 uses a feedback loop responsive to inverter input power (or other appropriate parameter such as propulsion battery current or loaded voltage) to increase the flux reference above that determined for optimal efficiency (i.e., in this implementation $\lambda_{waste}$ is greater than $\lambda_{eff}$) to enable use of, at maximum, all available battery power. Dissipation mode calculation process 230 sets $\lambda_{waste}$ within thermal and current limits of the motor and inverter.

As noted herein, a preferred embodiment implements the dissipation mode to improve performance in cold ambient operation. It should be noted that the applicable thermal and current limits on the system are generally higher in inverse relationship to the temperature of the propulsion battery and other system components. In cold ambient conditions, an EV has several different uses for the described dissipation mode, including:

1) When the propulsion battery is so cold as to have limited output power capability, dissipation mode consumes as much of the available battery propulsion power as possible to expedite internal heating of the battery which in turn increases the power available from the battery (which in turn continues to heat the battery faster, achieving still improved power availability for further heating until the desired performance/safety thresholds are achieved). Because the internal heating of the battery varies with current squared, in this mode battery internal losses will vary based upon battery implementation and operating conditions but can easily be 10 kW or more and can easily increase the heating rate of the battery by a factor of four. This reduces battery heat up times commensurately and greatly improves low temperature electric vehicle performance. This also extends vehicle driving range in all cases where the energy required to heat the pack is less than an amount of usable energy (at a minimum power) gained by increasing the battery temperature.

2) For EVs with liquid-cooled drive inverters and motors, further benefits are achievable using the dissipation mode option. When the thermal system of EV is architected similarly to that described the incorporated patent application such that the motor and drive inverter coolant loop is (or can optionally be) fed into the propulsion battery downstream of those components, then the additional heat from the dissipation mode loss in the drive inverter and motor is rejected to the cooling system and is then available to heat the propulsion battery. For the driving situation described above, this increases the rate of heating in the battery by adding additional heat from the motor and drive inverter to the battery. This achieves huge improvements to low temperature performance over a vehicle without such a dissipation mode option.

3) Preferred embodiments offer advantages for implementations even in cases other than the specifics of cases 1 and 2 described above. Some EVs include liquid cooled drive inverters and motors. For these EVs, the dissipation mode generates a large quantity of heat (e.g., >10 kW) that is useable in cooperation with the cooling system in a variety of ways. These options include heating the cabin via a liquid to air heat exchanger or heating the onboard propulsion battery, among other uses. As noted above, the colder the ambient temperature, the higher the potential heating rate can be, as the thermal limits of the drive inverter and motor are less likely to reduce available dissipation at colder ambient temperatures.

Figure 4:
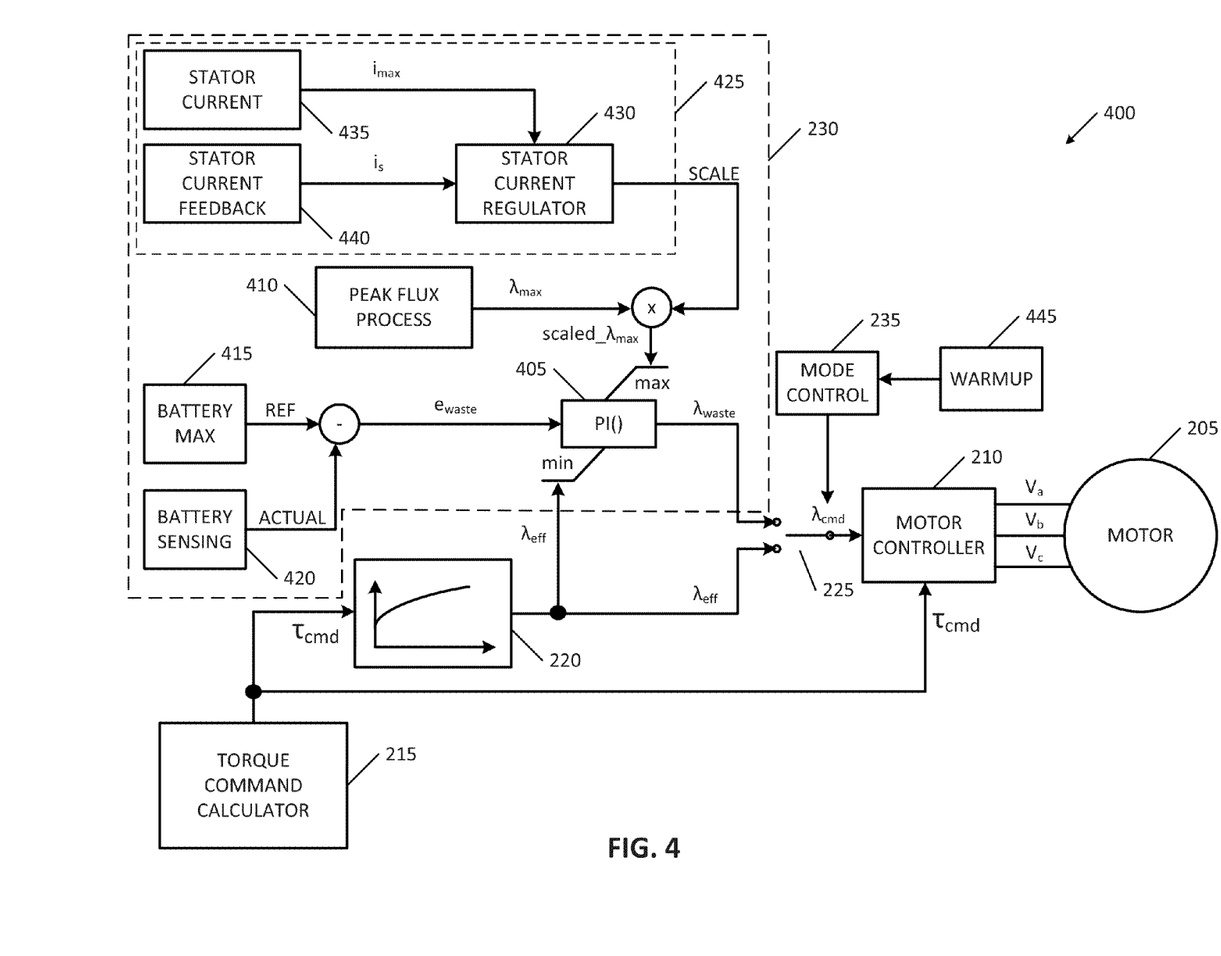
FIG. 4 illustrates generally a block schematic diagram for a representative control system including the components of the control system shown in FIG. 2 including a preferred implementation for a dissipation mode process.

FIG. 4 illustrates generally a block schematic diagram for a representative control system 400 including the components of system 200 shown in FIG. 2 including a preferred implementation for dissipation mode calculation process 230. The preferred embodiments of the present invention relate to purposeful excess power dissipation. In this context, excess power dissipation is defined as a 5% or greater difference in power dissipation between a particular operating mode and a dissipation mode, with other conditions constant (e.g., same torque/speed). The discussion regarding the saturation curve of FIG. 3 describes the ability to generate large amounts of current which can be converted to large quantities of heat quickly. The heat is preferably used to heat a propulsion battery when the propulsion battery performance is impaired due to cold ambient. The present invention is particularly relevant to batteries in which cold ambient severely impairs charging and/or available power. Some battery cell designs used in a propulsion battery can become virtually impossible to charge (or provide power) in cold ambient due to increased internal impedance. As a cell of this type is heated, charging becomes more efficient and more power is available, and more power may then be dissipated, further improving the performance for charging and power availability. It should also be understood that while maximum power dissipation is preferred, there are advantages in lower levels of inefficiencies for less than maximum but more than optimum power dissipation.

It should be appreciated that irrespective of the more detailed ways of capturing and repurposing excess heat as set forth herein, simply increasing the amount of power transferred (to the battery for charging, from the battery for EV operation) causes additional internal heating which further improves the relevant charging or power availability. Thus, maximizing the power dissipation in this context, particularly when that level of power dissipation is not optimal, will have a desired benefit even without more implementation details/requirements. This is one aspect of the invention described herein. Other embodiments described herein are directed to improving safety and efficiency when using the inefficiently dissipated power.

As noted above, process 230 includes feedback/control loops to ensure that the dissipation mode operation is within thermal and current constraints. Specifically, process 230 includes a PI (proportional-integral) controller 405 (though other feedback/control systems or processes may be employed) that uses the optimal efficiency flux $\lambda_{\mathit{eff}}$ as a minimum value and a maximum flux ($\lambda_{max}$) from a field weakening or peak flux process 410 that is optionally scaled as a maximum value (scaled_$\lambda_{max}$). Controller 405 also receives a waste error signal $e_{waste}$ from a difference between a reference signal from a battery maximum determining process 415 and a feedback of the actual value from a battery sensing process 420. The reference and actual values can be any appropriate parameter, such as for example, battery voltage, current, or power. Part of what process 415 does is provide an output that indicates a maximum available value for the relevant parameter. Part of the complexity of this in the context of EV operation is that the operator may be trying to drive the vehicle at cold ambient. Part of the available energy of the propulsion battery is used for moving the vehicle. The remainder maximum available power is, in a particular example, indicated by the value for the parameter provided from process 415.

Controller 405 sets the waste flux $\lambda_{waste}$ based upon the waste error signal using the optimal efficiency flux as a minimum and a scaled maximum flux as a maximum. The maximum flux from peak flux process 410 is scaled by an output (scale) from an optional, but desirable, protection subsystem 425. Protection subsystem 425 provides a check on the power dissipation by monitoring thermal or current levels or extended periods of high current or power dissipation, or other parameters that are a proxy for heat or other potentially damaging consequence of operation with elevated/maximum power dissipation. Consistent with this protection mechanism, the scaling factor SCALE has a value in the range of 0 to 1.

Details of a representative protection subsystem 425 are shown and may include a stator current regulator 430 to produce the scaling factor SCALE. Stator current regulation of motor 205 is one mechanism to reduce potential risk from maximum power dissipation. Regulator 430 receives two inputs ($i_{max}$ and $i_s$) to set the value for SCALE. A stator current process 435 generates $i_{max}$ based upon a thermal or peak stator current for the stator of motor 205. A stator current feedback process 440 generates $i_s$ based upon the stator current.

Based upon any particular torque command $\tau_{cmd}$, an optimal efficiency flux $\tau_{\mathit{eff}}$ and a waste flux $\lambda_{waste}$ are both generated. Mode controller 235 determines which flux value is communicated to motor controller 210. The waste flux $\lambda_{waste}$ of the preferred embodiment has a lower-bound set by the optimal efficiency flux $\lambda_{\mathit{eff}}$ and an upper bound set within the thermal and current constraints of system 400 through operation of a feedback/control system such as detailed in FIG. 4.

A "warmup" process 445 determines which flux is selected by mode controller 235 and used by motor controller 210. Process 445 is tailored to the specifics of each particular implementation. Process 445 may in some situations be complex and subtle in implementation. For any given set of operating conditions, including maximum available power from the battery and its temperature, process 445 must determine whether to actuate the dissipation mode. Further details of warm up process 445 are described below in connection with the discussion of FIG. 6.

Figure 5:
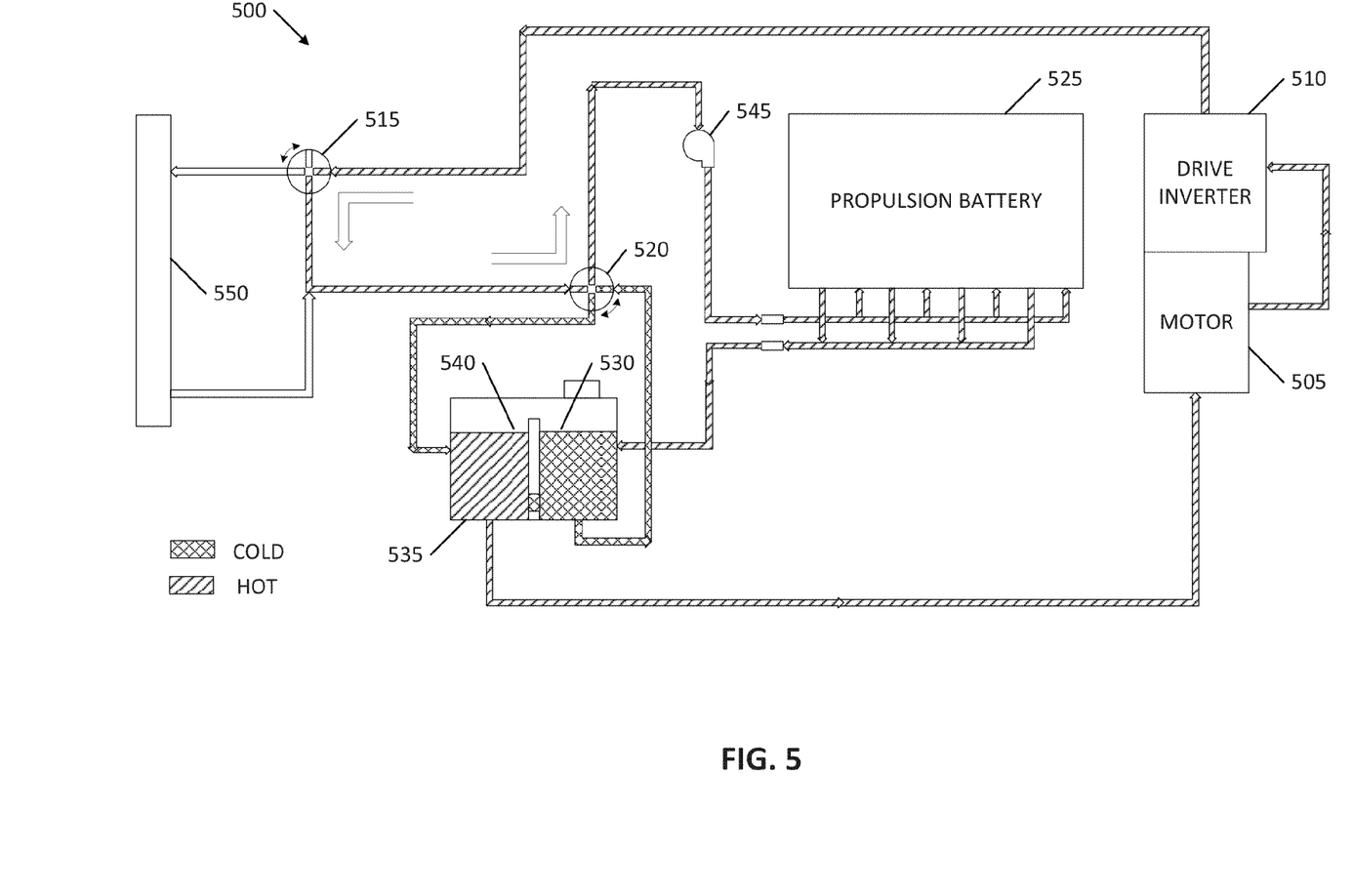
FIG. 5 illustrates a schematic diagram of an example of a multi-coolant loop thermal system used with dissipation mode.

FIG. 5 illustrates a schematic diagram of a multi-coolant loop thermal system 500 of the general type described in the incorporated patent application regarding coolant loops. While the discussion following describes an embodiment for an EV having multiloop cooling, the present invention is applicable to single-loop cooling systems as well, as there are other ways of controlling rejection of heat from the drive components into the coolant loop entering into the propulsion battery. During dissipation mode operation which intentionally and purposefully generates extra heat in a motor 505 and/or a drive inverter 510 (collectively the drive components which can include heat generated in the transmission or other system of the EV), system 500 is configured using a pair of valves (valve 515 and valve 520) to route coolant, in dissipation mode, exiting from these drive components into and through a propulsion battery 525 and then into a cold coolant compartment 530 of a reservoir 535. Cold coolant exiting from compartment 530 is, during dissipation mode, rerouted using valve 520 to return to a hot coolant compartment 540 of reservoir 535. In optimal efficiency mode, valve 520 routes coolant from compartment 530 using a pump 545 into battery 525 and routes coolant from the drive components into compartment 540. Valve 515 selectably routes coolant through an optional radiator 550. In dissipation mode, valve 515 bypasses radiator 550. Additional details of operation of system 500 are provided in the incorporated patent application.

Figure 6:
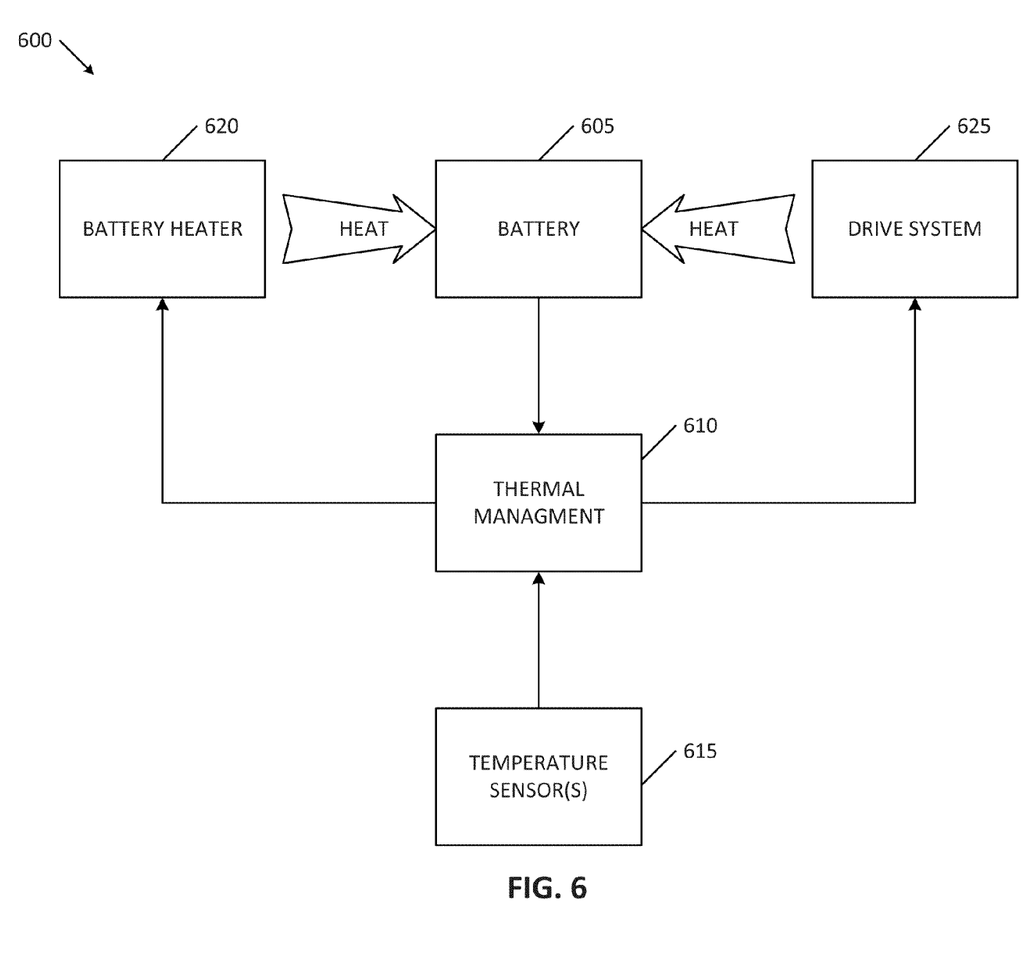
FIG. 6 illustrates a schematic diagram of a thermal control system for a propulsion battery.

FIG. 6 illustrates a schematic diagram of a thermal control system 600 for a propulsion battery 605. Battery 605 provides a "heating worthwhile" reference temperature signal to a thermal management system 610. This reference temperature signal indicates at what temperature, given the current condition of EV components and operation, it would be advantageous to heat battery 605 to improve performance. The thermal management system receives actual temperature(s) from one or more temperature sensors 615 to appropriately control a battery heater 620 and a drive system heating mechanism 625 (e.g., the dissipation mode described earlier that is enabled by the mode control, system 610 controlling mode controller 235). There are many factors and considerations as to determining the reference temperature and which heating system to actuate, at which time, when heating would be advantageous. Some of these factors and considerations are dependent upon the particulars of the implementations of any given embodiment. One factor to be considered is that while EV propulsion battery power available is often improved by heating, the act of heating itself uses energy from the battery, thus decreasing the SOC. Batteries generally have lower power at lower SOCs. In the preferred embodiments of the present invention, intentional excess dissipation is used to increase battery available power faster than the consumption of battery energy decreases the power (due to reducing battery SOC). At different temperatures and SOC for battery 605, it may be more advantageous to use an external battery heater versus the dissipation mode or not heat the battery at all, the determination variable based upon current conditions. The discussion below regarding FIG. 7 below provides some representative examples.

Figure 7:
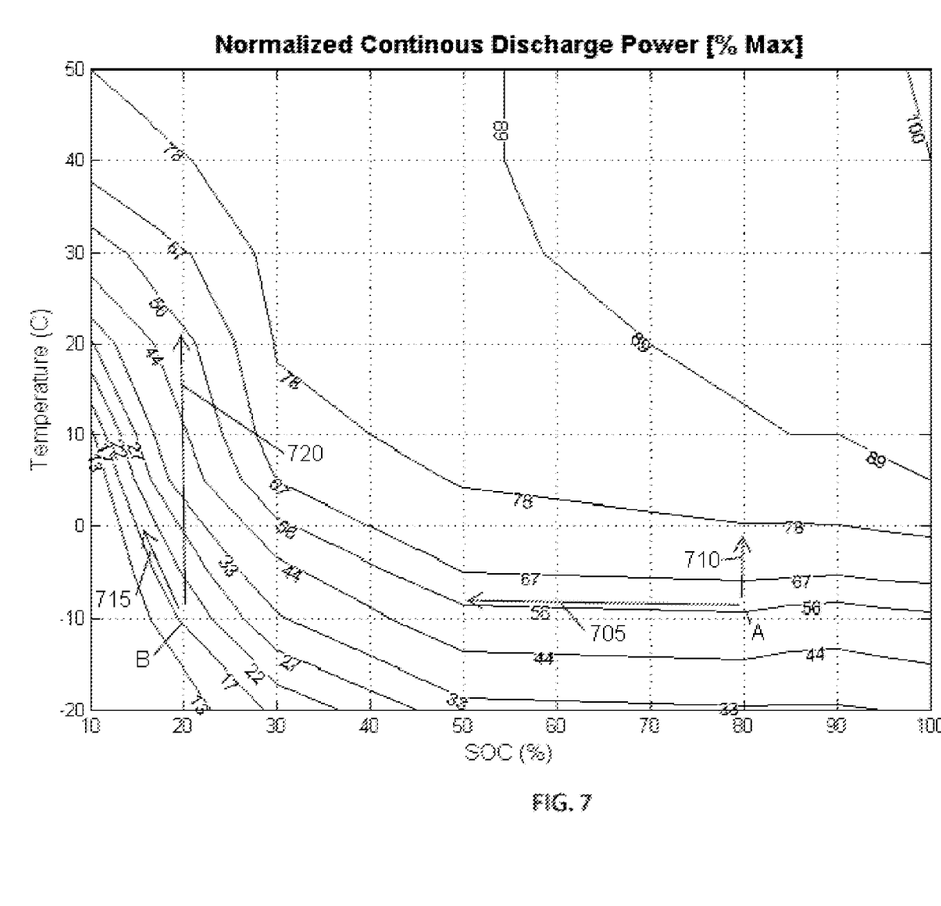
FIG. 7 illustrates a representative normalized power map for an energy storage system of an EV as a function of percent SOC and temperature.

FIG. 7 illustrates a representative normalized power map for an energy storage system (e.g., battery) of an EV as a function of percent SOC and temperature. The map includes several contours lines that illustrate normalized continuous discharge power (% max power) as a function of both percentage SOC and temperature (C). For example, at 90% SOC and 10 degrees C., the battery is able continuously discharge 89% of the theoretical maximum power.

Operational scenarios will be described in the context of two different points, A and B. At point A (80% SOC and −10 degrees C.), the battery delivers about 56% maximum power. At point B (20% SOC and −10 degrees C.), the battery delivers about 17% maximum power. At point A, the map is fairly flat for 56% maximum power. Scenario 705 illustrates that the battery is able to deliver 56% maximum power at −10 degrees C. down to about 50% SOC. In scenario A, use of energy does not degrade performance of the battery. However, scenario 710 illustrates that when energy from the battery is used to raise the temperature to 0 degrees C., the performance of the battery is improved as the user is able to now use about 78% of the maximum power. The more efficiently that the temperature of the battery is raised, the greater the maximum power that may be used from the battery.

The use of energy from the battery to raise the temperature decreases the percentage SOC. As seen for situations in which the percentage SOC is above about 50%, the discharge power contours are fairly flat so it is relatively easy to raise temperature without further degrading the percentage of maximum power. Point B, however, requires more careful considerations. The continuous discharge power contours are fairly steep and it is more challenging to use battery energy to raise the temperature without degrading the battery performance.

Scenario 715 illustrates that just to maintain the 17% maximum power discharge of point B where increasing the temperature to 0 degrees C., the percent SOC cannot decrease by more than about 5% without degrading performance. Scenario 720 illustrates that to achieve the same battery performance as point A (i.e., 56% maximum power), the temperature would need to be raised to at least 20 degrees C.

Both point A and point B describe context for usage cases for an EV in cold ambient. In either context, there are two general usage cases in which the EV does not have real useable power because of the temperature: a) while the useable power is insufficient for the needs of the user when starting, the user is able to drive at reduced performance as the battery is warmed; and b) the user requires a minimum performance level in order to use the EV at all (e.g., the user needs to operate on a highway and requires a minimum level of power discharge (e.g., 67%)). For both contexts with usage case a), the system optimizes raising temperature and minimizes energy use and the user is then able to render the EV useable.

For context A and usage case b), it is a relatively simple matter to raise the temperature quickly to about −5 degrees C. and then the user is able to use the highway. For context B and usage case b) it is more challenging to raise the temperature to at least 30 degrees C. without degrading battery performance. Again, the EV has been rendered useable by the present invention. The more "optimum" that the power dissipation mode is in raising temperature while minimizing energy use, the sooner the user will be able to enter onto the highway and the greater will be the increase in usability arising from implementation of embodiments of the present invention. Degrading battery performance in these examples means falling below a starting discharge power contour of the map shown in FIG. 7 so that the percentage of maximum power discharge is less than when started. It is important to be optimum/efficient when dissipating power for these uses in order to extend/enable use.

As noted herein, the system and process are most preferably implemented for enhancing cold ambient performance of an electric vehicle. The system and methods above has been described in general terms as an aid to understanding details of preferred embodiments of the present invention. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. An apparatus in an electric vehicle including a propulsion electric motor powered by energy from an energy storage system, comprising:
   a field oriented motor controller generating one or more motor control signals for the propulsion electric motor, said one or more motor control signals responsive to a flux command signal and a torque command signal;
   a torque command calculator, coupled to said field oriented motor controller, generating said torque command signal to command a desired torque;
   an optimal efficiency controller, coupled to said torque command calculator, generating an operating efficiency flux to operate the propulsion electric motor at a first determinable efficiency using a first power from the energy storage system while providing said desired torque;
   an excess dissipation controller generating an inefficient flux to operate the propulsion electric motor at a second determinable efficiency using a second power from the energy storage system, wherein said second power is greater than said first power, and wherein the inefficient flux produces a higher level of power dissipation than the operating efficiency flux; and
   a mode controller selecting one of an optimal efficiency mode or a dissipation mode as a selected mode wherein said optimal efficiency mode uses said operating efficiency flux as said flux command signal and wherein said dissipation mode uses said inefficient flux as said flux command signal;
   wherein the apparatus mitigates cold ambient performance degradation of the electric vehicle, wherein the energy storage system provides a heating worthwhile reference temperature signal to the apparatus, the heating worthwhile reference temperature signal indicating a temperature when to heat the energy storage system for improving performance, and wherein selection of the dissipation mode by the mode controller comprises an intentional excess dissipation that increases available power from the energy storage system faster than dissipation-mode consumption of energy decreases the available power from the energy storage system due to reduction in a state of charge of the energy storage system.

2. The apparatus according to claim 1 wherein said excess dissipation controller is coupled to said optimal efficiency controller and wherein said inefficient flux has a minimum value derived from said operating efficiency flux.

3. The apparatus according to claim 1 wherein said excess dissipation controller includes a feedback control loop responsive to an error signal derived from a difference between a battery reference parameter and a battery actual parameter.

4. The apparatus of claim 3 wherein said parameters include one or more of battery voltage, battery current, and battery power indicating available maximum available power for heat generation.

5. The apparatus of claim 4 wherein said inefficient flux is proportional to an output of said feedback control loop.

6. The apparatus of claim 5 further comprising a scaling factor applied to said output of said feedback control loop and a drive system thermal regulator generating said scaling factor.

7. The apparatus of claim 6 wherein said drive system thermal regulator includes a drive system feedback loop monitoring drive system effects responsive to said second power and a controller responsive to said drive system feedback loop providing said scaling factor limiting said second power when a component of a drive system of the electric vehicle is at risk from excess power dissipation resulting from said inefficient flux.

8. The apparatus of claim 1 wherein said liquid-based cooling system includes a plurality of reconfigurable coolant paths and one or more valves dynamically reconfiguring said plurality of reconfigurable coolant paths responsive to said selected mode.

9. The apparatus of claim 8 wherein one of said reconfigurable coolant paths includes coolant flowing from said propulsion system to the energy storage system in said dissipation mode without appreciable cooling, and wherein said quantity of heat is communicated to the energy storage system from said propulsion system by said one reconfigurable coolant path without significant cooling of said coolant therebetween.

10. The apparatus of claim 1 wherein said liquid-based cooling system includes a coolant path and a controller selectably rejecting a portion of said quantity of heat generated responsive to said dissipation mode into said coolant path responsive to selection of said dissipation mode.

11. The apparatus of claim 10 wherein said coolant path includes coolant flowing from said propulsion system to the energy storage system in said dissipation mode without appreciable cooling, and wherein a portion of said quantity of heat is communicated to the energy storage system from said propulsion system by said coolant path without significant cooling of said coolant therebetween.

12. The apparatus of claim 1 wherein said first power dissipation substantially minimizes power consumption from the energy storage system and wherein said second power substantially maximizes consumption of available power from the energy storage system.

13. The apparatus of claim 1 further comprising an inverter coupled to said field oriented motor controller, wherein the electric vehicle includes a liquid-based cooling system coupled to the propulsion electric motor and to said inverter, wherein the propulsion electric motor and said inverter are components of a propulsion system for the electric vehicle, wherein power dissipation at said inefficient flux for the propulsion electric motor and/or said inverter is at least 5% greater than the power dissipation at said operating efficiency flux, for a matching set of operational conditions, wherein said propulsion system communicates a quantity of heat produced to said liquid-based cooling system to heat the energy storage system, and wherein said liquid-based cooling system includes a heat exchanger to reject a portion of said quantity of heat into a passenger compartment of the electric vehicle.

14. A method for controlling a propulsion electric motor of an electric vehicle, the propulsion electric motor powered by energy from an energy storage system, the method comprising the steps of:
   a) generating a torque command signal to command a desired torque, said torque command signal used by a field oriented motor controller generating one or more motor control signals for the propulsion electric motor, said one or more motor control signals responsive to a flux command signal and said torque command signal;
   b) generating an operating efficiency flux to operate the propulsion electric motor at a first determinable efficiency using a first power from the energy storage system while providing said desired torque;
   c) generating an inefficient flux to operate the propulsion electric motor at a second determinable efficiency using a second power from the energy storage system, wherein said second power is greater than said first power, and wherein the inefficient flux produces a higher level of power dissipation than the operating efficiency flux; and d) selecting one of an optimal efficiency mode or a dissipation mode as a selected mode wherein said optimal efficiency mode uses said operating efficiency flux as said flux command signal and wherein said dissipation mode uses said inefficient flux as said flux command signal;

wherein cold ambient performance degradation of the electric vehicle is mitigated, wherein the energy storage system provides a heating worthwhile reference temperature signal, the heating worthwhile reference temperature signal indicating a temperature when to heat the energy storage system for improving performance, and wherein selection of the dissipation mode comprises an intentional excess dissipation that increases available power from the energy storage system faster than dissipation-mode consumption of energy decreases the available power from the energy storage system due to reduction in a state of charge of the energy storage system.

15. The method of claim 14 wherein said inefficient flux has a minimum value derived from said operating efficiency flux.

16. The method of claim 14 wherein said generating step c) includes operating a feedback control loop responsive to an error signal derived from a difference between a battery reference parameter and a battery actual parameter.

17. The method of claim 16 wherein said parameters include one or more of battery voltage, battery current, and battery power.

18. The method of claim 17 wherein said inefficient flux is proportional to an output of said feedback control loop.

19. The method of claim 18 wherein said generating step c) includes applying a scaling factor to said output of said feedback control loop and generating said scaling factor from a drive system thermal regulator.

20. The method of claim 19 wherein said drive system thermal regulator includes a drive system feedback loop monitoring drive system effects responsive to said second power and a controller responsive to said drive system feedback loop providing said scaling factor limiting said second power when a component of a drive system of the electric vehicle is at risk from excess power dissipation resulting from said inefficient flux.

21. The method of claim 14 further comprising: e) generating, in said dissipation mode, a first quantity of heat greater than a second quantity of heat which would be generated if operated in said optimal efficiency mode, for a matching set of operational conditions.

22. The method of claim 14 wherein said liquid-based cooling system includes a plurality of reconfigurable coolant paths and one or more valves dynamically reconfiguring said plurality of reconfigurable coolant paths responsive to said selected mode.

23. The method of claim 22 wherein one of said reconfigurable coolant paths includes coolant flowing from said propulsion system to the energy storage system in said dissipation mode, and wherein a portion of said first quantity of heat is communicated to the energy storage system from said propulsion system by said one reconfigurable coolant path without significant cooling of said coolant therebetween.

24. The method of claim 14 wherein said liquid-based cooling system includes a coolant path and a controller selectably rejecting a portion of said first quantity of heat generated responsive to said dissipation mode into said coolant path responsive to selection of said dissipation mode.

25. The method of claim 24 wherein said coolant path includes coolant flowing from said propulsion system to the energy storage system in said dissipation mode without appreciable cooling, and wherein a portion of said first quantity of heat is communicated to the energy storage system from said propulsion system by said coolant path without significant cooling of said coolant therebetween.

26. The method of claim 14 wherein said first power substantially minimizes power consumption from the energy storage system and wherein said second power substantially maximizes consumption of available power from the energy storage system.

27. The method of claim 26 wherein a first power dissipation at said inefficient flux for the propulsion electric motor and/or said inverter is at least 5% greater than a second power dissipation at said operating efficiency flux.

28. The method of claim 14 wherein an inverter is coupled to said field oriented motor controller, wherein the electric vehicle includes a liquid-based cooling system coupled to the propulsion electric motor and to said inverter, wherein the propulsion electric motor and said inverter are components of a propulsion system for the electric vehicle propelled using the propulsion electric motor, wherein said step c) includes generating in said propulsion system a first quantity of heat greater than a second quantity of heat which would be generated if operated in said optimal efficiency mode for a matching set of operational conditions, and further includes communicating a portion of said first quantity of heat to said liquid-based cooling system, and wherein said liquid-based cooling system includes a heat exchanger to reject a portion of said first quantity of heat into a passenger compartment of the electric vehicle.

* * * * *